(12) United States Patent
Yan et al.

(10) Patent No.: US 12,492,301 B2
(45) Date of Patent: Dec. 9, 2025

(54) DIAPHRAGM AND SOUND GENERATING DEVICE

(71) Applicant: GOERTEK INC., Shandong (CN)

(72) Inventors: Fuzhen Yan, Shandong (CN); Weichao Wang, Shandong (CN); Chun Li, Shandong (CN)

(73) Assignee: GOERTEK INC., Weifang (CN)

( * ) Notice: Subject to any disclaimer, the term of this patent is extended or adjusted under 35 U.S.C. 154(b) by 598 days.

(21) Appl. No.: 17/995,121

(22) PCT Filed: Aug. 24, 2021

(86) PCT No.: PCT/CN2021/114382
§ 371 (c)(1),
(2) Date: Sep. 30, 2022

(87) PCT Pub. No.: WO2022/160689
PCT Pub. Date: Aug. 4, 2022

(65) Prior Publication Data
US 2023/0167282 A1 Jun. 1, 2023

(30) Foreign Application Priority Data
Jan. 29, 2021 (CN) .......................... 202110134089.0

(51) Int. Cl.
*C08L 9/02* (2006.01)
*C08K 3/04* (2006.01)
(Continued)

(52) U.S. Cl.
CPC .................. *C08L 9/06* (2013.01); *C08K 3/04* (2013.01); *C08K 5/17* (2013.01); *H04R 7/02* (2013.01);
(Continued)

(58) Field of Classification Search
None
See application file for complete search history.

(56) References Cited

U.S. PATENT DOCUMENTS

| 4,429,068 A | 1/1984 | Nakahira |
| 2016/0229927 A1 | 8/2016 | Motoda et al. |

FOREIGN PATENT DOCUMENTS

| CN | 102271911 A | 12/2011 |
| CN | 104581557 A | 4/2015 |
| (Continued) | | |

OTHER PUBLICATIONS

International Search Report from International Application No. PCT/CN2021/114382 mailed Nov. 23, 2021.

*Primary Examiner* — Richard A. Huhn
(74) *Attorney, Agent, or Firm* — Shih IP Law Group, PLLC

(57) ABSTRACT

Disclosed is a diaphragm and a sound generating device. The raw material of the diaphragm comprises a liquid diene-based rubber and a vulcanizing agent, and the liquid diene-based rubber comprises a liquid butadiene-based rubber or a liquid isoprene-based rubber. The diaphragm is prepared by injecting the raw material into a diaphragm forming mold and then performing a cross-linking reaction. The diaphragm has an elongation at break of more than 200%, therefore the reliability of the diaphragm is high, the diaphragm has a damping of more than 0.07, and the has higher damping in the range of the operating temperature and frequency, therefore the loudspeaker using this diaphragm may obtain lower THD, higher listening yield, better sound quality, and swing during vibration not easily occurs, the listening stability is good, and the diaphragm can also ensure that the defects such as diaphragm folding and diaphragm damage not easily occurs after low temperature reliability.

15 Claims, 2 Drawing Sheets

(51) Int. Cl.
  *C08K 5/17* (2006.01)
  *C08L 9/06* (2006.01)
  *H04R 7/02* (2006.01)
  *H04R 31/00* (2006.01)
  *C08K 3/22* (2006.01)

(52) U.S. Cl.
  CPC ..... *H04R 31/003* (2013.01); *C08K 2003/222* (2013.01); *C08K 2003/2296* (2013.01); *C08L 2312/02* (2013.01); *H04R 2231/001* (2013.01); *H04R 2307/025* (2013.01)

(56) References Cited

FOREIGN PATENT DOCUMENTS

| | | | |
|---|---|---|---|
| CN | 110708635 A | 1/2020 | |
| CN | 110708637 A | 1/2020 | |
| CN | 110708638 A | 1/2020 | |
| CN | 110784805 A | 2/2020 | |
| CN | 110951172 A | 4/2020 | |
| CN | 111654790 A | 9/2020 | |
| CN | 110708636 B | 11/2020 | |
| CN | 111935602 A | 11/2020 | |
| CN | 111935625 A | 11/2020 | |
| CN | 111935626 A | 11/2020 | |
| GB | 842896 A | 7/1960 | |
| JP | S5876247 A | 5/1983 | |
| JP | H01229600 A | 9/1989 | |
| JP | 2002080660 A | 3/2002 | |
| JP | 2003055619 A | 2/2003 | |
| WO | 2018005502 A1 | 1/2018 | |

DIAPHRAGM AND SOUND GENERATING DEVICE

TECHNICAL FIELD

The present disclosure relates to the field of acoustic, and in particular, to a diaphragm and a sound generating device.

BACKGROUND ART

Existing sound generating device often generally uses rubber diaphragms, especially, liquid silicone rubber is more commonly used. Such diaphragm has a wide range of temperature resistance, good resilience, and can be integrally formed. With requirements on high power and waterproof has been increasing, liquid silicone rubber diaphragms have been increasing used in loudspeakers. On the one hand, since the main chain of liquid silicone rubber is mainly Si—O—Si, and the side groups thereof are mainly —CH3, the liquid silicone rubber has a regular structure, a small steric hindrance, a small intermolecular friction and a low loss. On the other hand, the glass transition temperature of liquid silicone rubber is relatively lower, generally less than or equal to −100° C., and the damping thereof is the highest in the range of glass transition temperature. Therefore, in the operating temperature and frequency range, the damping of the liquid silicone rubber diaphragm is low. Therefore, in the case of using this diaphragm, THD (Total Harmonic Distortion) of the loudspeaker is relatively high, the listening is poor, and swing easily occurs during vibration, and the listening stability is poor, and the user experience is poor.

SUMMARY

The main purpose of the present disclosure is to provide a diaphragm and a sound generating device, and is designed to solve the problem of low damping and poor acoustic performance of the liquid silicone rubber diaphragm often used in the existing sound generating device.

In order to achieve the above purpose, the present disclosure proposes a diaphragm, a raw material of the diaphragm comprises liquid diene-based rubber and a vulcanizing agent, and the liquid diene-based rubber comprises a liquid butadiene-based rubber or a liquid isoprene-based rubber. The diaphragm is prepared by injecting the raw material into a diaphragm forming mold and then performing a cross-linking reaction. The diaphragm has a damping of more than 0.07 and a glass transition temperature of −90° C. to 0° C.

Optionally, the diaphragm has an elongation at break of more than 200%.

Optionally, the diaphragm has a Young's modulus of 3 to 100 MPa.

Optionally, the diaphragm has a hardness of 10 to 95 A, and the diaphragm has a thickness of 10 to 300 μm.

Optionally, the diaphragm has a hardness of 30 to 85 A, and the diaphragm has a thickness of 10 to 200 μm.

Optionally, the liquid diene-based rubber comprises at least one selected from a group consisting of a liquid cis-butadiene-based rubber, a liquid butyl rubber, a liquid isoprene rubber, a liquid styrene-butadiene-based rubber, and a liquid neoprene rubber.

Optionally, the liquid diene-based rubber is represented by a structure formula below:

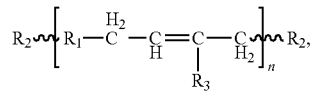

wherein n is a natural number, $R_1$ is a structural unit, $R_2$ is a H atom or an active functional group, and $R_3$ is a hydrogen group or a substituent.

Optionally, $R_1$ comprises a copolymerized unit of styrene or 1,2-butadiene, and $R_2$ comprises a hydroxyl group, a carboxyl group, a thiol group, an amino group, an epoxy group, an isocyanate group or a xanthate group.

Optionally, based on 100 parts by weight of the liquid diene-based rubber, the vulcanizing agent is comprised in an amount of 1 to 15 parts by weight, and the vulcanizing agent comprises at least one selected from a group consisting of isocyanates, epoxy, amines, sulfur, peroxides, hydroxides, metal oxides, and polyaziridine compounds.

Optionally, the vulcanizing agent comprises at least one selected from a group consisting of isocyanates, epoxy, amines, peroxides, hydroxides, metal oxides, and polyaziridine compounds.

Optionally, the raw material further comprises a filler, the filler is comprised in an amount of 0 to 90 parts by weight, and the filler comprises at least one selected from a group consisting of carbon black, silicon dioxide, clay, calcium carbonate, kaolin, talc powder, and unsaturated metal carboxylate.

Optionally, the filler is comprised in an amount of 3 to 70 parts by weight.

Optionally, the raw material further comprises an anti-aging agent, and the anti-aging agent is comprised in an amount of 1 to 15 parts by weight of, the anti-aging agent is anti-aging agent N-445 (4,4'-bis(dimethylbenzyl) diphenylamine-p-phenylenediamine), anti-aging agent 246 (2,4,6-tri-tert-butylphenol), anti-aging agent 4010 (N-phenyl-N'-cyclohexyl-p-phenylenediamine), anti-aging agent SP (styrenated phenol), anti-aging agent RD (2,2,4-trimethyl-1,2-dihydroquinopolymer ketamine), anti-aging agent ODA (4,4'-dioctyldiphenylamine), anti-aging agent OD (diphenylamine derivative) or anti-aging agent WH-02 (alkylated diphenylamine derivatives).

Optionally, the raw material further comprises an auxiliary agent, and the auxiliary agent comprises at least one selected from a group consisting of an accelerator, an activator, an ultraviolet absorber, a plasticizer, a colorant, and an internal mold release agent.

In addition, the present disclosure further provides a sound generating device, comprising the above-described diaphragm.

In the technical solution of the present disclosure, the raw materials of the diaphragm comprise liquid diene-based rubber and a vulcanizing agent, the liquid diene-based rubber comprises a liquid butadiene-based rubber or a liquid isoprene-based rubber, and the diaphragm is prepared by injecting the raw materials into the diaphragm forming mold and then performing a cross-linking reaction. The diaphragm has a damping of more than 0.07 and a glass transition temperature of −90° C. to 0° C., and in the operating temperature and frequency ranges, the diaphragm has higher damping. Therefore, the loudspeaker to which the diaphragm is applied can obtain lower THD, higher listening yield, and better sound quality, and is not easy to generate swing during vibration, the listening stability thereof is good, and the diaphragm can also ensure that the defects such as diaphragm folding and diaphragm damage not easily occurs after low temperature reliability. In addition, the liquid diene-based rubber has a higher surface energy than that of liquid silicone rubber, and the diaphragm of the present disclosure is easier to be bonded by using an adhesive. Moreover, the diaphragm of the present disclosure is formed by injection molding using liquid diene-based rubber and vulcanizing agent. Compared with the diaphragm formed by compression molding of solid raw materials, the diaphragm of the present disclosure has the advantages that the diaphragm has uniform thickness, small residual stress after molding, and high flatness of the diaphragm, and improves the acoustic performance of the sound generating device.

BRIEF DESCRIPTION OF THE DRAWINGS

In order to explain the embodiments of the present disclosure or the technical solutions in the prior art more clearly, the accompanying drawings that are used in the description of the embodiments or the prior art will be briefly introduced in the following descriptions. Obviously, the drawings in the following descriptions are only some embodiments of the present disclosure. For those of ordinary skill in the art, other drawings can also be obtained according to the structures illustrated in these drawings without inventive efforts.

DESCRIPTIONS OF REFERENCE NUMBERS OF THE EMBODIMENTS

Figure 1:
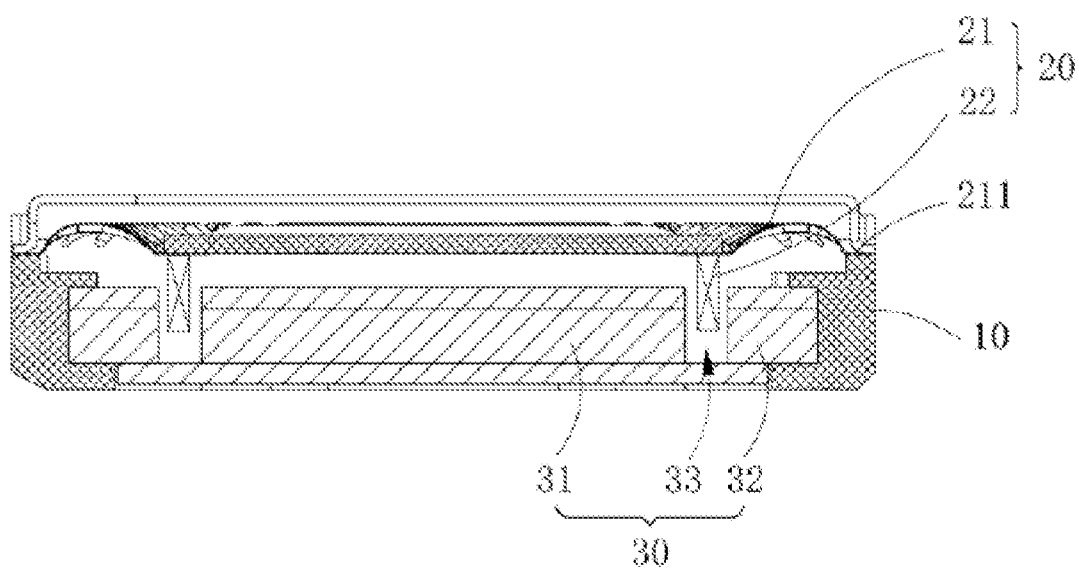
FIG. 1 is a cross-sectional view of a sounding generating device according to an embodiment of the present disclosure.

| 10 | housing | 20 | vibration system |
|---|---|---|---|
| 21 | diaphragm | 211 | fixing portion |
| 22 | voice coil | 30 | magnetic circuit system |
| 31 | main magnet steel | 32 | secondary magnet steel |
| 33 | magnetic gap | | |

The realization, functional features and advantages of the present disclosure will be further described with reference to the accompanying drawings in conjunction with the embodiments.

DETAILED DESCRIPTION OF EMBODIMENTS

Various exemplary embodiments of the present application will now be described in detail. It should be understood that the relative arrangement of components and steps, numerical expressions and numerical values set forth in these embodiments do not intend to limit the scope of the present application unless specifically stated otherwise.

Techniques, methods, and apparatus known to those skilled in the art may not be discussed in detail, but where appropriate, such techniques, methods, and apparatus should be considered part of the specification. In all examples shown and discussed herein, any specific value should be construed as merely exemplary and not as a limitation. Accordingly, other examples of the exemplary embodiments may have different values.

The present disclosure proposes a diaphragm, the raw material of the diaphragm comprises liquid diene-based rubber and vulcanizing agent, and the liquid diene-based rubber comprises a liquid butadiene-based rubber or a liquid isoprene-based rubber. The diaphragm is prepared by injecting the raw material into the diaphragm forming mold and then performing a cross-linking reaction. The damping of the diaphragm is more than 0.07, and has higher listening yield and lower THD (Total Harmonic Distortion). The diaphragm has a glass transition temperature of −90° C. to 0° C. In the above temperature and frequency ranges, it not only allows the loudspeaker to which the diaphragm is applied to have higher damping, but also ensures that the defects such as diaphragm folding and diaphragm damage not easily occurs after low temperature reliability.

The liquid diene-based rubber in the present embodiment is a liquid polymer at room temperature. The liquid diene-based rubber and the vulcanizing rubber are injected into the diaphragm forming mold after uniformly mixed, to fill the mold cavity and perform cross-link under a certain temperature and pressure, so as to form the diaphragm. It should be noted that the temperature herein may be 25° C. to 230° C., and the pressure may be 0.01 to 10 MPa. The liquid diene-based rubber of the present embodiment is different from conventional solid diene-based rubbers in the art. The conventional solid diene-based rubbers are in a solid state at room temperature, and have a relatively large molecular weight, and the molecular chain ends thereof do not contain active functional groups, and the molecular chain ends are not vulcanized. The vulcanizing agent is generally sulfur and the like, and it is generally necessary to manufacture products through plastination mastication and then adding compounding agents for mixing, followed by performing processes such as calendering and the like. The vulcanizing agent is generally sulfur or peroxide, which have high vulcanization temperatures. Liquid diene-based rubber is in a liquid state at normal temperature and has a low molecular weight (generally between 500 and 20,000), belongs to prepolymers, and the molecular chain ends thereof usually contain active functional groups. The vulcanizing agents are usually isocyanates, epoxies, amines, peroxides, hydroxides, metal oxides, polyaziridine compounds, etc., which react with active functional groups to perform vulcanization, and since the molecular chain ends of the above-described liquid diene-based rubber participate in the reaction, the diaphragm prepared according to the above has better elasticity, and can still obtain better acoustic performance and reliability under relatively strict using conditions. In some cases, liquid diene-based rubber may also be a prepolymer that does not contain active functional groups at the chain ends, and is vulcanized by using a vulcanizing agent for solid diene-based rubber such as sulfur, and when this kind of vulcanizing agent is vulcanized, since the molecular chain ends of the liquid diene-based rubber do not participate in the reaction, the molecular chain ends of the liquid diene-based rubber are in a free state. Thereby, the prepared diaphragm has relatively poor elasticity. When preparing the diaphragm of the present embodiment, generally, the prepolymer is directly mixed with the compounding agent and then injected into the mold to fill the mold cavity and perform cross-link so as to form the product, and the prepolymer has a wide range of vulcanization temperature, and some are vulcanized and cross-linked even at room temperature. The diaphragm has an elongation at break of more than 200%

(the test standard is ASTM D882, the tensile speed is 300 mm/min, and the gauge length is 30 mm), therefore the diaphragm prepared therefrom has high reliability and is not easy for the diaphragm to be damaged. Moreover, the diaphragm has a damping of more than 0.07, and in the above temperature and frequency ranges, the diaphragm has higher damping, therefore the loudspeaker using the diaphragm can obtain lower THD, higher listening yield, and better sound quality, and is not easy to generate swing during vibration, the listening stability is good, and the user experience is excellent. In addition, the surface of a conventional liquid silicone rubber is covered by methyl groups, so that the surface energy is relative lower. It is difficult for many kinds of adhesives to bond with them, and only silica gel can be used for the bonding, but the efficient of bonding is low and the cost is expensive. Compared with conventional liquid silicone rubbers, the liquid diene-based rubber of the present embodiment has a higher surface energy, and the diaphragm of the present disclosure is easier to bond with an adhesive. In addition, the diaphragm in this embodiment has a glass transition temperature of −90 to 0° C. The polymer material is at a temperature close to the glass transition temperature, and the chain segments can sufficiently move, but the chain segments cannot keep up, therefore the hysteresis phenomenon is significant and the damping effect is good. A maximum value of internal friction will occur at this temperature. Generally, the glass transition temperature is closer to the operating temperature, the damping effect is better. Therefore, compared with liquid silicone rubber with a glass transition temperature less than 100° C., it has higher damping (generally, more than 0.07) in the range of operating temperature and frequency, therefore the loudspeaker using this diaphragm can obtain a lower THD, a higher listening yield, a better sound quality, and it is not easy to generate swing during vibration, the listening stability is good, and the user experience is good. In addition, compared with liquid silicone rubber, the surface energy is higher, it is easier to bond (with voice coil, dome, etc.) by using an adhesive, and the cost is low.

The liquid diene-based rubber comprises at least one selected from a group consisting of a liquid cis-butadiene-based rubber, a liquid butyl rubber, a liquid isoprene rubber, a liquid styrene-butadiene-based rubber, and a liquid neoprene rubber. Liquid cis-butadiene-based rubber is a synthetic rubber with regular structure polymerized from butadiene, and its cis-structure content is more than 95%, and compared with natural rubber and styrene-butadiene-based rubber, it has especially excellent cold resistance, wear resistance and elasticity after vulcanization, less heat generation under dynamic load and good aging resistance, and is easy to be used together with natural rubber, neoprene or nitrile rubber. Liquid butyl rubber is synthesized from isobutylene and a small amount of isoprene, and has good air tightness and good heat resistance, ozone resistance and aging resistance. Liquid isoprene rubber is synthesized from isoprene, and has good elasticity and cold resistance, as well as high tensile strength. Liquid styrene-butadiene-based rubber is a copolymer of polystyrene and butadiene, and has good wear resistance, heat resistance, aging resistance, and fast vulcanization rate. Liquid chloroprene rubber is mainly polymerized from chloroprene, and has good physical and mechanical properties, excellent oil resistance and heat resistance.

Liquid diene-based rubber is a kind of liquid rubber which is in fluid state at room temperature, and there are three types of them, i.e., one with active functional groups at the end group, one with active groups in the middle of the molecule, and one without any active functional groups, and the liquid diene-based rubber is represented by a structure formula below:

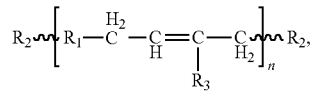

wherein n is a natural number, $R_1$ is a structural unit, for example, $R_1$ may be a copolymerized unit of styrene or 1,2-butadiene, $R_2$ is a H atom or an active functional group, and $R_2$ is preferably an active functional group, which is facilitate to chain extension and cross-linking. For example, $R_2$ active functional group may be a hydroxyl group, a carboxyl group, a thiol group, an amino group, an epoxy group, an isocyanate group or a xanthate group, and $R_2$ functional groups at both ends may be the same as or different from each other. $R_3$ is a hydrogen group or a substituent, wherein $R_3$ substituent may be a methyl group, a phenyl group, a chloro group, or the like.

The diaphragm has a Young's modulus of 3 to 100 MPa. If the Young's modulus is too small, a diaphragm has to be thicker in order to obtain an appropriate F0 (resonant frequency), and a heavy weight of the diaphragm will result in lower sensitivity. If the Young's modulus is more than 100 MPa, the elongation at break decreases, and the diaphragm is easy to be damaged after reliability. Therefore, by controlling the diaphragm to have a modulus in the range of 3 to 100 MPa, a more appropriate F0 (resonant frequency), low frequency performance and reliability can be obtained.

The diaphragm has a hardness of 10 to 95 A, and the thickness is 10 to 300 μm. If the hardness of the diaphragm is lower than 10 A, the rigidity of the diaphragm is poor, and it is easy to generate polarization, resulting in poor THD. If the hardness is higher than 95 A, the elongation at break of the rubber becomes smaller, and the diaphragm is easy to be broken during the low temperature reliability verification, resulting in product failure, and too much filler in the formulation results in deficiencies. More preferably, when the hardness is 30 to 85 A, the loudspeaker to which the diaphragm is applied has more excellent acoustic performance. If the thickness of the diaphragm is less than 10 μm, the damping of the diaphragm is small, and the listening performance is poor. If the thickness of the diaphragm is more than 300 μm, the weight of the diaphragm is too heavy, and the sensitivity becomes poor. Therefore, the diaphragm is controlled to have a thickness in the range of 10 to 300 μm, so that the sound generating device has more excellent acoustic performance. Preferably, the diaphragm has a thickness of 10 to 200 μm, so that the sound generating device has more excellent acoustic performance.

The raw material of the diaphragm of the present disclosure contains a vulcanizing agent, and the vulcanizing agent comprises at least one selected from a group consisting of isocyanates, epoxy, amines, sulfur, peroxides, hydroxides, metal oxides, and polyaziridine compounds. Based on 100 parts by weight of the olefin liquid rubber, the vulcanizing agent is comprised in an amount of 1 to 15 parts by weight. If the amount of the vulcanizing agent is too little, the degree of cross-linking is low, the overall strength of the diaphragm is low, and the heat resistance is poor, and thus it is difficult to obtain better reliability. If the amount of vulcanizing agent is too much, the degree of cross-linking is too high, the diaphragm would be brittle, the elongation at break is too low, and the diaphragm is easy to be damaged during vibration. More preferably, the vulcanizing agents are usually isocyanates-based, epoxy-based, amines-based, peroxides, hydroxides, metal oxides, polyaziridine compounds, since the liquid diene-based rubber of such vulcanizing agent reacts and crosslinks with the active functional groups introduced at the end of the molecular chain, the resulting rubber has higher elasticity, whereby when sulfur or peroxide is used as the vulcanizing agent, it reacts with the double bond in the molecular chain, and the end of the molecular chain does not participate in the reaction, the resulting rubber has relatively poor elasticity and is more brittle, and it is difficult to obtain better acoustic performance and reliability under more strict using conditions. In some cases, sulfur or peroxide may be used. The liquid diene-based rubber of the present embodiment has a wide range of vulcanization temperature, and some of them can even be vulcanized and cross-linked at room temperature.

In one embodiment, the raw material further comprises filler, and the filler comprises at least one selected from a group consisting of carbon black, silicon dioxide, clay, calcium carbonate, kaolin, talc powder and unsaturated metal carboxylate. The above-described reinforcing fillers can adjust hardness, enhance and improve physical and mechanical properties. For example, carbon black has an amorphous structure, in which the particles constitute aggregates through physical and chemical bonding between each other. The primary structure of carbon black is composed of aggregates, and there are van der Waals forces or hydrogen bonds between the aggregates, and they can aggregate into a spatial network structure, i.e., the secondary structure of carbon black. The surface of carbon black has groups such as hydrogen, carboxyl, lactone, free radical, quinone group that substitution, reduction, oxidation reactions, and so on can be occurred. When they are added to liquid diene-based rubber, due to the strong interaction between the carbon black surface and the rubber interface, the molecular chain is relatively easy to slide on the carbon black surface but is not easy to separate from the carbon black when a force is applied to the material. The elastomer and the carbon black constitute a slidable strong bond, and the mechanical strength is improved. Based on 100 parts by weight of the liquid diene-based rubber, the filler is comprised in an amount of 0 to 90 parts by weight. If the filler is too much, the hardness of the diaphragm will be too high, the elongation at break of the diaphragm will be low, and the diaphragm is brittle, therefore the diaphragm is easy to be damaged after reliability. More preferably, when the amount of filler is 3 to 70 parts by weight, the sound generating device using this diaphragm has more excellent acoustic performance, and the diaphragm is not easy to be damaged after reliability.

In another embodiment, the raw material further comprises an anti-aging agent, and the anti-aging agent is comprised in an amount of 1 to 15 parts by weight of, and the anti-aging agent is anti-aging agent N-445, anti-aging agent 246, anti-aging agent 4010, anti-aging agent SP, anti-aging agent RD, anti-aging agent ODA, anti-aging agent OD or anti-aging agent WH-02. During the use of the liquid rubber diaphragm, as time passes, the molecular chain may gradually break to generate free radicals. By mixing an anti-aging agent in the system, the autocatalytic phenomenon that generates active free radicals can be prevented, stopped, or alleviated. Based on 100 parts by weight of the liquid diene-based rubber, the anti-aging agent is comprised in an amount of 1 to 15 parts by weight. During the use of the rubber, if the mixing amount of the anti-aging agent is too little, the effect of prolonging the service life may not be achieved. However, if the mixing amount of the anti-aging agent is too much, it is difficult for the anti-aging agent to be sufficiently dissolved in the injecting rubber body, therefore the anti-aging agent is difficult to disperse uniformly. As a result, the mechanical properties of the final diaphragm may be decreased. Based on 100 parts by weight of the injecting rubber body, the anti-aging agent may be comprised in an amount selected in the range of 1 to 15 parts by weight, so that better anti-aging and mechanical properties can be achieved.

In yet another embodiment, the raw material further comprises an auxiliary agent, and the auxiliary agent comprises at least one selected from a group consisting of an accelerator, an activator, an ultraviolet absorber, a plasticizer, a colorant, and an internal mold release agent. The accelerator mainly plays a role of reducing the vulcanization time, lowering the vulcanization temperature, decreasing the amount of the vulcanizing agent, and increase, and thus improving the physical properties of the product. The accelerators may be thiazoles, sulfenamides, thiurams, guanidines, xanthates, aldamines, thioureas, amines, and the like. The activator mainly plays a role of improving the vulcanization rate and vulcanization efficiency, and increasing the activity of the accelerator. The activator may be at least one selected from a group consisting of inorganic materials such as metal oxides, metal hydroxides, basic carbonates, or organic materials such as fatty acids, soaps, amines, polyols, aminoalcohols, and the like. Plasticizer is mainly used to adjust hardness, improve processability and low temperature toughness and the like, and the plasticizer may comprise one or more of aliphatic dibasic acid esters, phthalates, benzene polyesters, benzoates, polyol esters, chlorinated hydrocarbons, epoxy, citric acid esters and polyester, and the polar groups on the plasticizer and the polar groups on the rubber molecules attract each other, which reduces the interaction of the polar groups on the rubber molecules. Therefore, it works like that the added plasticizer shields the polar groups on the injecting diene-based rubber molecules and becomes a shielding effect, resulting in reduced physical cross-linking points. On the other hand, the molecules of plasticizers are much smaller than those of rubber molecules, and thus they are easier to move, so it is easy to provide the space required by chain segment movement, and increase the free volume between molecules, reducing the glass transition temperature of the material, and increasing the cold resistance property of the material. Based on 100 parts by weight of the liquid diene-based rubber, the plasticizer is comprised in an amount of 0 to 20 parts by weight. An ultraviolet absorber is a light stabilizer, which can absorb the ultraviolet ray portion of sunlight and fluorescent light sources without changing itself. The internal mold release agent is mainly used to improve the processing performance, and may be stearic acid and stearate, octadecylamine and alkyl phosphate, α-octadecyl-ω-hydroxypolyoxyethylene phosphate, and the like. Based on 100 parts by weight of the liquid diene-based rubber, the internal mold release agent is comprised in an amount of 0 to 5 parts by weight.

In addition, the present disclosure also provides a sound generating device, as shown in FIG. 1, the sound generating device comprises a housing 10, a vibration system 20 and a magnetic circuit system 30, and the vibration system 20 and the magnetic circuit system 30 are disposed in the housing. The vibration system 15 comprises a voice coil 22 and a diaphragm 21 made of the above-described liquid diene-based rubber. The outer periphery of the diaphragm 21 is provided with a fixed part 211 connected to the casing 10, one end of the voice coil 22 is connected to the diaphragm 21. The magnetic circuit system 30 comprises a main magnetic steel 31 and a secondary magnetic steel 32 disposed with an interval, and a magnetic gap 33 is formed between the main magnetic steel 31 and the auxiliary magnetic steel 32, the other end of the voice coil 22 extends into the magnetic gap 33 of the magnetic circuit system 30, and the voice coil 22 is supplied with an alternating current, so that the voice coil 22 vibrates up and down under the action of the magnetic field force to drive the diaphragm 21 to vibrate up and down so as to generate sound.

When the sound generating device is operating, the electrical signal is input to the voice coil 22 of the product, and the magnetic field force is applied to the voice coil 22, and moves in different amplitudes and directions as the signal magnitude, the positive and negative directions alternately change, thereby driving the diaphragm 21 to vibrate and generate sound, so as to complete the electricity-power-sound energy conversion process.

Optionally, the diaphragm of the present disclosure may be a corrugated rim diaphragm or a flat plate diaphragm. In a specific embodiment of the present disclosure, When the diaphragm has a Shore hardness in the range of 10 to 95 A and a thickness in the range of 10 to 300 μm, it enables the resonant frequency F0 of the micro sound generating device to reach 100 to 1500 Hz. The low frequency performance of the micro sound generating device is excellent.

The diaphragm of the present disclosure will be described in detail below with two Examples and one Comparative Example, wherein the diaphragms of the two Examples and the Comparative Example have substantially the same F0 at room temperature condition, and the difference in F0 is less than 20 Hz. It should be understood that the following description is only exemplary, rather than a specific limitation to the present application.

Example 1

The diaphragm of the present embodiment comprises the following main raw materials: 100 g of liquid neoprene, 20 g of carbon black, 4 g of zinc oxide, 3 g of magnesium oxide, and 3 g of anti-aging agent RD. Among them, carbon black is used as the filler, and zinc peroxide and magnesium oxide are used as the vulcanization system. The method of preparing the diaphragm of this embodiment comprises the following steps: injecting the above-described raw materials into the diaphragm forming mold after uniformly mixing the raw materials, the raw materials fill the whole mold cavity and cross-linked at a temperature of 25° C. and a pressure of 5 MPa to form a diaphragm having a hardness of 50 A and a thickness of 105 μm, and the diaphragm has a glass transition temperature of −90° C.

Example 2

The diaphragm of this embodiment comprises the following main raw materials: 100 g of liquid neoprene, 40 g of carbon black, 7 g of ethylenediamine, 2 g of triethylenetetramine, and 3 g of anti-aging agent RD. Among them, carbon black is used as the filler, and ethylenediamine and triethylenetetramine are used as the vulcanization system. The method of preparing the diaphragm of this embodiment comprises the following steps: injecting the above-described raw materials into the diaphragm forming mold after uniformly mixing the raw materials, the raw materials fill the whole mold cavity and cross-linked at a temperature of 100° C. and a pressure of 0.5 MPa to form a diaphragm having a hardness of 70 A and a thickness of 87 μm, and the diaphragm has a glass transition temperature of 0° C.

Comparative Example 1 is a liquid silicone rubber diaphragm having a hardness of 50 A and a diaphragm thickness of 105 μm. Using DMA (dynamic thermomechanical analyzer) to test the respective diaphragm materials of Comparative Example 1, Example 1 and Example 2, to obtain the damping factor at room temperature. Assembling the diaphragm of Comparative Example 1, Example 1 and Example 2 into a sound generating device and testing the listening yield, as shown in Table 1.

The damping factor test conditions are: testing the raw materials of the diaphragms of the embodiments and the Comparative Example, and testing the graph of damping with the change of the temperature in the dynamic thermodynamic analyzer (DMA) tensile mode: frequency is 1 Hz, heating rate is 3/min, strain is 0.2%, and the damping factor is the corresponding damping value at 23° C.

The listening yield is tested by assembling the diaphragms of the embodiments and the diaphragm of the Comparative Example into the same sound generating device, and performing the listening yield test, respectively. The measurement is performed based on 20 products having substantially the same F0, and the difference of F0 is less than 20 Hz.

TABLE 1

| Damping factor and listening yield | | |
|---|---|---|
| Diaphragm | damping factor | listening yield |
| Comparative Example 1 | 0.05 | 50 |
| Example 1 | 0.13 | 100 |
| Example 2 | 0.2 | 100 |

It can be seen from Table 1 that, compared with the liquid silicone rubber diaphragm, the liquid neoprene diaphragm of Example 1 and Example 2 has a significantly larger damping factor and a significantly higher listening yield.

Figure 2:
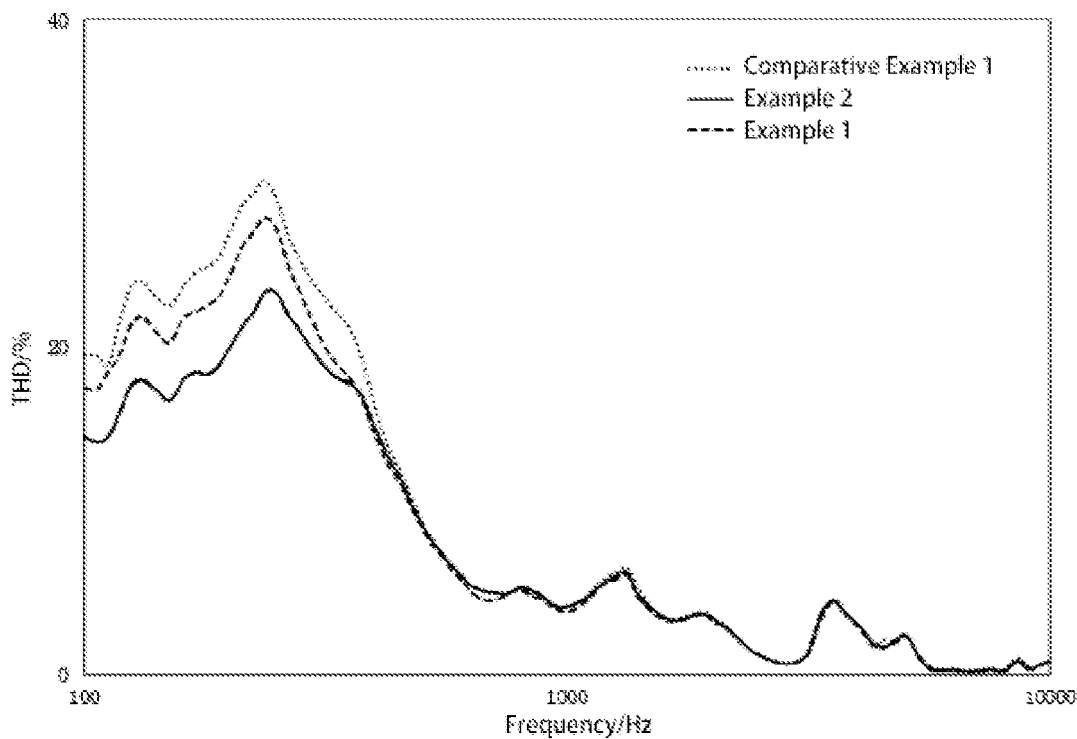
FIG. 2 is the THD test curve comparison diagram of the Example 1, Example 2 and Comparative Example 1 of the present disclosure.
Figure 3:
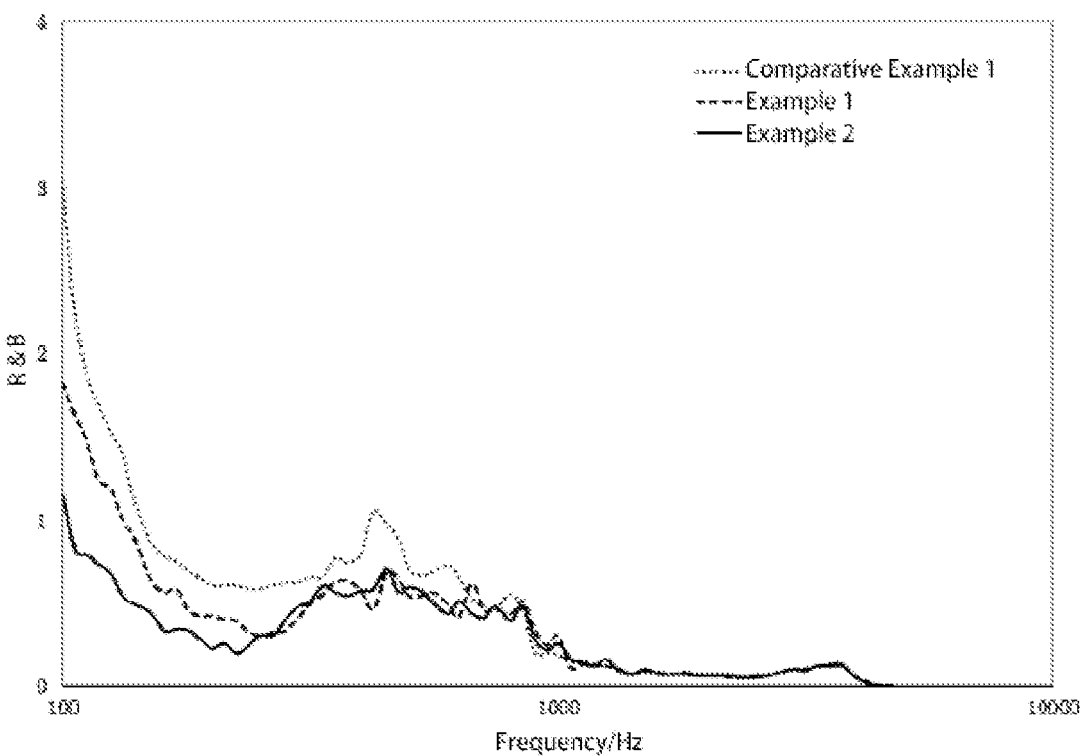
FIG. 3 is a comparison diagram of R&B (Rub&Buzz, high order harmonic distortion) test curves of the Example 1, Example 2 and Comparative Example 1 of the present disclosure.

It can be seen from FIG. 2 that, compared with the liquid silicone rubber diaphragm, the THD of the injecting liquid neoprene rubber diaphragms of Examples 1 and 2 is significantly reduced, which indicates that the diaphragms of Examples 1 and 2 have better anti-polarization ability, more excellent sound quality, and THD the diaphragms of Example 2 is lower, mainly because the diaphragm of Example 2 has a higher glass transition temperature and has a greater damping in the operating temperature range, and the diaphragm of Example 2 has a higher hardness, better diaphragm stiffness, less nonlinear vibration, and thus it has lower THD. As can be seen from FIG. 3, compared with the liquid silicone rubber diaphragm, R&B (Rub&Buzz, high-order harmonic distortion) of the injecting liquid neoprene diaphragm of Examples 1 and 2 is significantly reduced. R&B is mainly related to the sense of listening, and thus the diaphragms of Examples 1 and 2 have less abnormal noise and better acoustic performance, and the R&B of Example 2 is lower, which mainly because Example 2 has a higher glass transition temperature and has a greater damping in the operating temperature range, and thus it has lower R&B. The THD and R&B as shown in the test graphs are measured by assembling the diaphragms of Examples 1 and 2 and the Comparative Example into the same sound generating device.

The above are only the preferred embodiments of the present disclosure, and are not intended to limit the scope of the present disclosure. Under the conception of the present disclosure, the equivalent structural transformation made by the contents of the description and drawings of the present disclosure, or directly/indirectly application in other related technical fields are all included in the protection scope of the present disclosure.

What is claimed is:

1. A diaphragm, wherein a raw material of the diaphragm comprises liquid diene-based rubber and a vulcanizing agent,
wherein the liquid diene-based rubber comprises a liquid butadiene-based rubber or a liquid isoprene-based rubber,
wherein the diaphragm is prepared by injecting the raw material into a diaphragm forming mold and then performing a cross-linking reaction, and
wherein the diaphragm has a damping factor of more than 0.07 as measured using dynamic mechanical analysis (DMA) in tensile mode at a frequency of 1 Hz, a heating rate of 3° C./min, a strain amplitude of 0.2%, and a temperature of 23° C., and a glass transition temperature of −90° C. to 0° C.

2. The diaphragm of claim 1, wherein the diaphragm has an elongation at break of more than 200% as measured according to ASTM D882 at a tensile speed of 300 mm/min and a gauge length of 30 mm.

3. The diaphragm of claim 1, wherein the diaphragm has a Young's modulus of 3 to 100 MPa as measured according to ASTM D882 at a tensile speed of 300 mm/min and a gauge length of 30 mm.

4. The diaphragm of claim 1, wherein the diaphragm has a hardness of 10 to 95 Shore A, and the diaphragm has a thickness of 10 to 300 μm.

5. The diaphragm of claim 4, wherein the diaphragm has a hardness of 30 to 85 Shore A, and the diaphragm has a thickness of 10 to 200 μm.

6. The diaphragm of claim 1, wherein the liquid diene-based rubber comprises at least one selected from a group consisting of a liquid cis-butadiene-based rubber, a liquid butyl rubber, a liquid isoprene rubber, a liquid styrene-butadiene-based rubber, and a liquid neoprene rubber.

7. The diaphragm of claim 1, wherein the liquid diene-based rubber is represented by a structure formula below:

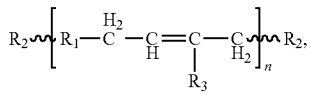

wherein n is a natural number, $R_1$ is a structural unit, $R_2$ is a H atom or an active functional group, and $R_3$ is a hydrogen group or a substituent.

8. The diaphragm of claim 7, wherein $R_1$ comprises a copolymerized unit of styrene or 1,2-butadiene, and $R_2$ comprises a hydroxyl group, a carboxyl group, a thiol group, an amino group, an epoxy group, an isocyanate group or a xanthate group.

9. The diaphragm of claim 1, wherein, based on 100 parts by weight of the liquid diene-based rubber, the vulcanizing agent is comprised in an amount of 1 to 15 parts by weight, and the vulcanizing agent comprises at least one selected from a group consisting of isocyanates, epoxy, amines, sulfur, peroxides, hydroxides, metal oxides, and polyaziridine compounds.

10. The diaphragm of claim 9, wherein the vulcanizing agent comprises at least one selected from a group consisting of isocyanates, epoxy, amines, peroxides, hydroxides, metal oxides, and polyaziridine compounds.

11. The diaphragm of claim 1, wherein the raw material further comprises a filler, the filler is comprised in an amount of 0 to 90 parts by weight, and the filler comprises at least one selected from a group consisting of carbon black, silicon dioxide, clay, calcium carbonate, kaolin, talc powder, and unsaturated metal carboxylate, based on 100 parts by weight of the liquid diene-based rubber.

12. The diaphragm of claim 11, wherein the filler is comprised in an amount of 3 to 70 parts by weight, based on 100 parts by weight of the liquid diene-based rubber.

13. The diaphragm of claim 9, wherein the raw material further comprises an anti-aging agent, and the anti-aging agent is comprised in an amount of 1 to 15 parts by weight, based on 100 parts by weight of the liquid diene-based rubber, and the anti-aging agent is anti-aging agent N-445, anti-aging agent 246, anti-aging agent 4010, anti-aging agent SP, anti-aging agent RD, anti-aging agent ODA, anti-aging agent OD or anti-aging agent WH-02.

14. The diaphragm of claim 1, wherein the raw material further comprises an auxiliary agent, and the auxiliary agent comprises at least one selected from a group consisting of an accelerator, an activator, an ultraviolet absorber, a plasticizer, a colorant, and an internal mold release agent.

15. A sound generating device, comprising the diaphragm according to claim 1.

* * * * *